(12) United States Patent
Bajaj et al.

(10) Patent No.: US 11,064,750 B2
(45) Date of Patent: Jul. 20, 2021

(54) SYSTEM AND METHOD FOR MANUFACTURING OF GARMENTS

(71) Applicant: SAMSHEK FASHION PRIVATE LIMITED, New Delhi (IN)

(72) Inventors: Samiksha Bajaj, Amritsar (IN); Abhishek Bajaj, Amritsar (IN); Rijul Bajaj, Amritsar (IN)

(73) Assignee: Samshek Fashion Private Limited, New Delhi (IN)

( * ) Notice: Subject to any disclaimer, the term of this patent is extended or adjusted under 35 U.S.C. 154(b) by 111 days.

(21) Appl. No.: 16/032,906

(22) Filed: Jul. 11, 2018

(65) Prior Publication Data

US 2019/0008225 A1    Jan. 10, 2019

Related U.S. Application Data

(63) Continuation of application No. PCT/IB2017/000053, filed on Jan. 12, 2017.

(60) Provisional application No. 62/277,861, filed on Jan. 12, 2016.

(51) Int. Cl.
*A41H 3/00* (2006.01)
*G06Q 10/04* (2012.01)
*A41H 1/02* (2006.01)
*A41H 3/04* (2006.01)
*G05B 19/4097* (2006.01)
*G06Q 30/06* (2012.01)

(52) U.S. Cl.
CPC .............. *A41H 3/007* (2013.01); *A41H 1/02* (2013.01); *A41H 3/04* (2013.01); *G05B 19/4097* (2013.01); *G06Q 10/043* (2013.01); *G06Q 30/0621* (2013.01); *G05B 2219/35012* (2013.01); *G06Q 30/0641* (2013.01)

(58) Field of Classification Search
CPC . A41H 3/00; A41H 3/007; A41H 3/04; A41H 42/00; A41H 1/02
USPC .................................................. 700/130–132
See application file for complete search history.

(56) References Cited

U.S. PATENT DOCUMENTS

| 6,473,671 | B1 | 10/2002 | Yan |
| 6,725,124 | B2 | 4/2004 | Yan |
| 6,907,310 | B2 | 6/2005 | Gardner et al. |
| 2001/0026272 | A1* | 10/2001 | Feld ........................ G06Q 30/06 345/419 |

(Continued)

FOREIGN PATENT DOCUMENTS

WO    2011129906    10/2011

OTHER PUBLICATIONS

International Search Report and Written Opinion received for counterpart International Application No. PCT/IB2017/000053, dated Jun. 19, 2017 (10 pages).

*Primary Examiner* — Nathan E Durham
(74) *Attorney, Agent, or Firm* — Perkins Coie LLP (57) ABSTRACT

A method and apparatus for automatically manufacturing a custom fit garment is provided. The method comprises creating a pattern for the garment to be manufactured and determining at least a portion of the body of the customer to be scanned based on the created pattern and scanning at least the portion of body of the customer to determine sizing requirements for the garment to be manufactured. The method further comprises customizing the pattern for the garment to be manufactured based on the determined sizing requirement and automatically manufacturing the garment based on the customized pattern.

18 Claims, 8 Drawing Sheets

(56) References Cited

U.S. PATENT DOCUMENTS

| | | | |
|---|---|---|---|
| 2005/0049741 A1* | 3/2005 | Dias | D04B 37/02 700/141 |
| 2006/0015207 A1* | 1/2006 | Weiser | G06Q 10/06 700/132 |
| 2006/0174399 A1 | 8/2006 | Nikolayev et al. | |
| 2006/0190122 A1* | 8/2006 | Loeb | G06Q 10/087 700/132 |
| 2007/0198118 A1* | 8/2007 | Lind | A41H 3/007 700/138 |
| 2008/0312765 A1* | 12/2008 | Gardiner | A41H 1/00 700/132 |
| 2009/0222127 A1* | 9/2009 | Lind | D04B 1/22 700/132 |
| 2010/0228646 A1* | 9/2010 | Heidel | G06Q 30/0601 705/26.1 |
| 2013/0144424 A1* | 6/2013 | Jarbouai | G06F 9/06 700/134 |
| 2013/0315475 A1 | 11/2013 | Song et al. | |
| 2014/0277683 A1* | 9/2014 | Gupta | G06Q 50/04 700/132 |
| 2015/0302597 A1* | 10/2015 | Bentson | G06K 9/00221 345/633 |

* cited by examiner

SYSTEM AND METHOD FOR MANUFACTURING OF GARMENTS

CROSS-REFERENCE TO RELATED APPLICATIONS

This application is a continuation of International Application No. PCT/IB2017/000053 entitled SYSTEM AND METHOD FOR MANUFACTURING OF GARMENTS, filed Jan. 12, 2017, which claims the benefit of U.S. Provisional Patent Application No. 62/277,861 entitled SYSTEM AND METHOD FOR MANUFACTURING OF GARMENTS, filed Jan. 12, 2016, both of which are incorporated herein by reference in their entireties.

TECHNICAL FIELD

The present invention relates generally to the field of garments manufacturing. In particular, the present disclosure relates to a system and method for manufacturing of customized garments by utilizing one or more automated tools.

BACKGROUND

With the current era of readymade garments, the manufacturing of garments is performed using mass production manufacturing systems. Such systems use chain system of pattern making softwares, multiple automated cutters and tailors to make multiple identical ready to wear garments of same size at one point of time. However, the readymade garments manufactured using the mass production manufacturing systems are made in standardized sizes as distinct from made to measure or bespoke clothing tailored to a particular person's size. These standard sized ready to wear garments may not provide a perfect fit to all the customers, thereby adding to a need for later alterations.

The well-known alternative to the above mentioned problem is to get personalized tailored garments that provide perfect fit based on the size requirements of a customer. However, the personalized tailoring requires a person to manually measure, cut and sew the garment based on the sizing requirement of the customer, which consumes a lot of effort and time. Further, due to human involvement in measurement, cutting, and sewing stages of the traditional manufacturing process, there are possibilities of errors in the manufacturing of garments.

In addition to the above traditional approach, there are various processes available for automating one or more stages of manufacturing process of garments. One such example is creating a 3-D body model and a virtual prototype of garments using computer-aided design for virtual warping of garments on customer in order to address customer's individual needs. However, current systems do not provide a complete process which address all the aforementioned shortcomings of traditional manufacturing processes.

In view of the above, there is a need for an efficient manufacturing process of garments that reduces the manufacturing time. Further, there is a need for more automated and proficient system to address the human errors and also to provide perfect fit to the customer based on sizing requirements of the customer.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Briefly, in accordance with the various embodiments, there is described herein, a method for manufacturing a customized garment for a customer based on preferences and size of the customer. The method comprises creating a pattern for the garment to be manufactured and determining at least a portion of the body of the customer based on the created pattern. The method further comprises scanning, by a scanner, the at least the portion of the body of customer to determine sizing requirements for the garment to manufactured and then customizing/grading the pattern for the garment to be manufactured based on the determined sizing requirement. The method further comprises manufacturing the garment based on the customized design for the garment. The grading scale can be selected by the customer.

Further, in accordance with the various embodiments of the present technology, there is described herein, a system for manufacturing a customized garment for a customer based on preferences and sizing requirements of the customer. The system comprises a computing device for creating a pattern for a garment based on the user inputs and determining at least a portion of the body of the customer based on the created pattern. The system further comprises a scanner configured to scan at least the portion of the body of the customer based on the created pattern. The system further comprises a processor configured to determine the sizing requirements for the garment to be manufactured based on the scanned at least the portion of the body of the customer and for customizing the pattern for the garment to be manufactured based on the determined size for the garment to be manufactured.

Figure 1:
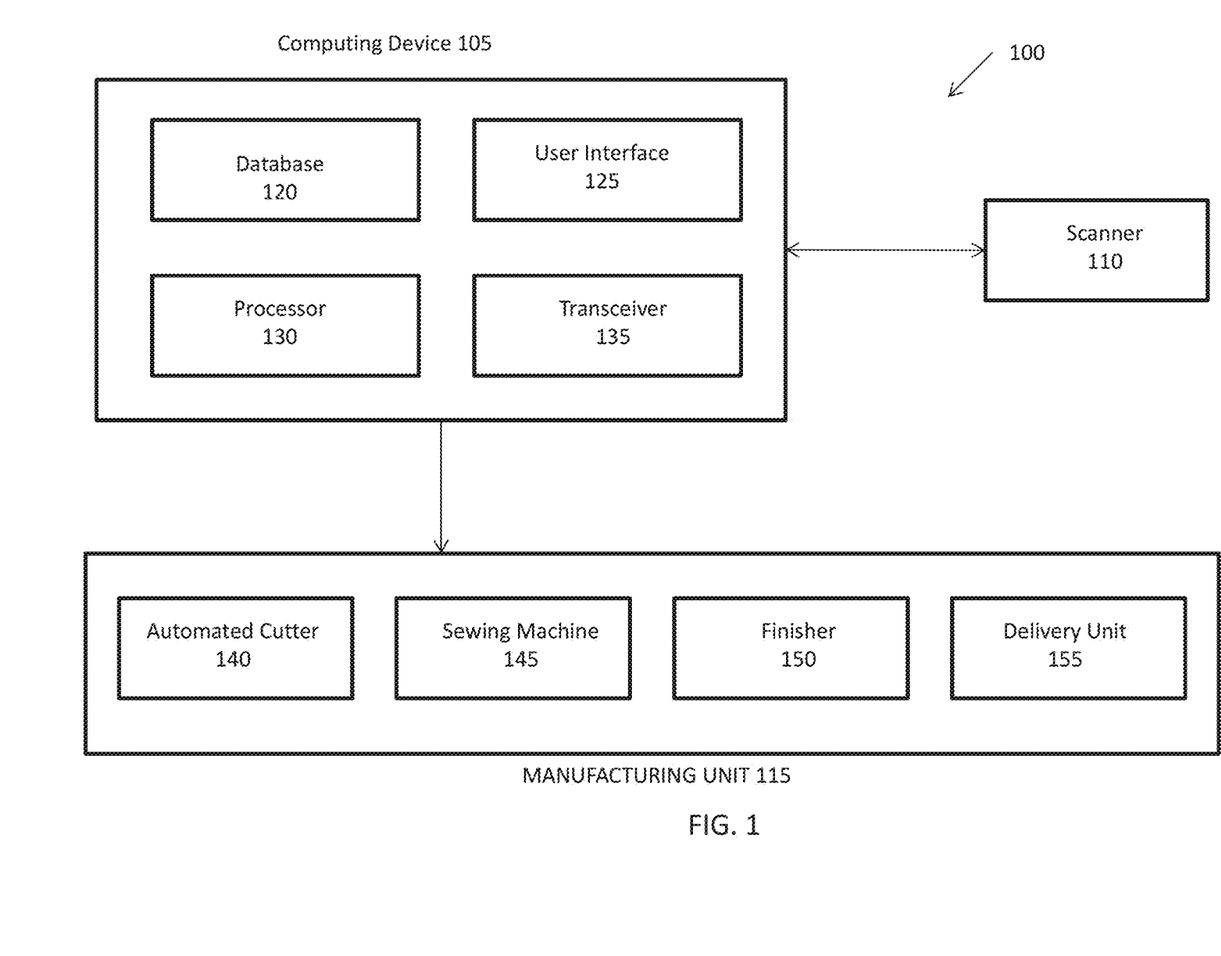
FIG. 1 is a block diagram of a system for manufacturing a customized fit garment for operation in accordance with some embodiments of the present technology.

FIG. 1 is a block diagram of a system 100 for manufacturing customized garments in accordance with various embodiments. The system 100 comprises a computing device 105, a scanner 110, and a manufacturing unit 115 for manufacturing customized garments for a customer based on preferences and sizing requirements of the customer. In accordance with one embodiment, all entities of the system 100 will be present at a single location, for example, a brick and mortar store. In accordance with another embodiment, the computing system 105 may be accessible remotely at a customer mobile device which is located away from the location of other entities of system 100. In yet another embodiment, the manufacturing unit 115 may exist separately, for example, as a backend entity to the other entities of system 100.

The computing device 105 may be a server or any computing device such as a desktop computer, a personal digital assistant (PDA), a notebook computer, a tablet, a mobile device, or any wearable devices, and the like. The computing device 105 includes a database 120 that stores various types of garments, various styles for each type of garments, various types of fabrics available, various colors and designs of available fabrics and embellishments, patterns (e.g., template patterns, created patterns, customized patterns, etc.), scan information, customer measurement data, algorithms for modifying patterns, pattern making software, or the like. The various types of garments may include, but not limited to, shirts, trousers, gowns, dresses, and jackets. Further, the styles for the garments may include, but not limited to, full sleeves, half sleeves, long, short, knee length, tight fitted, and loose fitted patterns based on the type of garment. The type of fabrics may include, but not limited to, woolen, polyester, silk, and cotton. The various types of garments, various styles for each type of garments, various types of fabrics available, various colors and designs (e.g., patterns) of available fabrics and embellishments are stored in the database 120 by a designer or any authorized user. The designer or the authorized user is allowed to add, delete or modify the existing data stored in the database 120. In accordance with an embodiment, the database 120 may be a separate entity, located remotely, capable of communicating with the computing device 105.

The computing device 105 further includes a user interface 125 that displays options such as various types of garments, various styles for each type of garments, various types of fabrics available, various colors and designs of available fabrics and embellishments stored in the database 120 to the customer for selection. The user interface 125 receives one or more inputs from the customer corresponding to the displayed options. In accordance with some embodiments, the user interface 125 also provides the customer an option to co-create or customize a design for the garment to be manufactured. In an embodiment of the present technology, the user interface 125 is a touch screen panel or any other interface through which the customer selects one or more items required for the manufacturing of customized garments. The touch screen panel may be, for example, a capacitive touch screen interface of a computing device 105. In accordance with an embodiment, the user interface 125 displays various options such as type of garment, style of garment, color and fabric type in the form of selectable windows for receiving customer preferences for garment manufacturing. The customer may be prompted to select one or more options displayed at the user interface 125 and based on the selection of the option, the user interface 125 displays one or more corresponding options. In accordance with an exemplary embodiment, when the customer selects an option for the type of garment, the user interface 125 displays various options such as, but not limited to, shirt, trouser, gown, dresses, jacket and jeans to the customer in a different or same window and receives selection of one of the various garment options, which he wishes to get manufactured. Based on the selection of the type of the garment, the user interface 125 further displays various styles or designs available for the selected garment to the customer and receives the selection. The user interface 125 may further display the type, the color and the designs of the fabric available and receive selection or inputs from the customer. The user interface 125 is further discussed in detail in FIG. 3 of the present disclosure.

In an alternative embodiment of the technology, the user interface 125 provides a customization/co-creation option, where the customer selects a combination of styles, colors, fabric designs, fitting, length, etc. for manufacturing of a garment. Based on the customized inputs received from the customer, the user interface 125 displays a final pattern for selection by the customer. In accordance with some embodiments of the present technology, the user interface 125 also provides the customer an option to modify the displayed pattern or create a new pattern for the garment. In another embodiment of the present technology, the user interface 125 provides one or more options including, but not limited to, color tone, event type, etc. and the customer provides inputs with respect to these displayed options. Based on the received inputs, the user interface displays one or more customized designs of the garments at the user interface 125 for customer selection.

The computing device 105 further includes a processor 130 that processes the received customer's selection of the type of garment, style of garment, fabric type, fabric design, and fabric color through the user interface 125 and creates a pattern for the garment based on the customer's selection of one or more of the type of garment, style of garment, fabric type, fabric design, and fabric color. In accordance with some embodiments of the present technology, the computing device 105 modifies the created pattern or creates a new pattern based on any additional inputs received from the user through the user interface 125. In accordance with an exemplary embodiment of the present technology, various patterns are prepared and/or modified using a pattern making software such as Gerber Accumark® pattern making software. Further, the processor 130 analyzes the created pattern and determines at least one portion of the body of the customer that needs to be scanned for measurements in order to manufacture the customized garment. The at least one portion of the customer's body corresponds to required measurements for the garment to be manufactured as selected by the customer at the user interface 125. In an exemplary embodiment of the present technology, the at least one portion of the customer's body includes measurements of the customer's body ranging from neck area to waist area and excluding the below-waist area of the body. Further, the processor 130 receives measurements data of the customer from the scanner 110 and determines the sizing requirements of the customer based on the measurements data. The measurements data comprises, but not limited to, measurements of one or more body parts of the customer. The processor 130 further customizes the created pattern based on the determined sizing requirements of the customer. In accordance with an exemplary embodiment, customizing the selected pattern comprises grading the pattern or scaling up/down the selected pattern. In some embodiments, the processor 130 can create customized designs based upon stored customer information, such as body scans (including measurement data) stored by the database 120. If the processor 130 determines that additional measurements are needed, the customer can be notified that additional scanning is recommended. The processor 130 can include one or more microprocessors, microcontrollers, DSPs (digital signal processors), state machines, logic circuitry, or any other mechanism that is capable of processing information based on operational or programming instructions.

The computing device 105 further includes a transceiver 135 that transmits instructions to the scanner 110 to scan the determined at least one portion of the body of the customer, and receives the scanned data of the at least one portion of the body of the customer from the scanner 110. The transceiver 135 further transmits the customized design and other details like fabric type, fabric color, fabric design, and embellishments selected by the customer to the manufacturing unit 115. In an embodiment of the present technology, the computing device 110 may be any device, located either remotely or locally, through which the customer can access the database and selects the garment type, garment design, fabric type and fabric design.

The scanner 110 may be a scanning apparatus, which may facilitate scanning of the customer's body parts. In an exemplary embodiment, the scanner 110 is a 3D scanner or any scanner capable of scanning the at least one portion of the body of customer based on the determined at least one portion of the body of customer. The scanner 110 scans the at least one portion of the body of customer based on the determined at least one portion of the body of customer and transmits the scanned data to the computing device 105. The scanner 110 includes a transceiver (not shown) for communicating with the computing device 105.

The system 100 further comprises the manufacturing unit 115. The manufacturing unit 115 includes, but not limited to, an automated cutter 140, a sewing machine 145, a finisher 150 and a delivery unit 155. The automated cutter 140 receives the customized pattern and other details like fabric type, fabric color, and fabric design selected by the customer and automatically cuts the fabric selected by the customer, based on the customized pattern i.e. based on the sizing requirements of the customer, into pieces. In accordance with an embodiment of the present invention, the automated cutter 140 is a single ply automated cutter. The pieces of the fabric is then provided to the sewing machine 145 that stitches the pieces together with a thread or by some other means known in the art. The sewing machine may be a robotic sewing machine or a manual sewing machine.

Accordingly, the sewing may be performed using robotic sewing machine, or manual sewing machine, or a combination of both. The stitched pieces of the fabric is then provided to the finisher 150 that finishes the stitched fabric by using one or more of vacuum, blowing, and steaming table and provides the finished garment to the delivery unit 155. In accordance with an embodiment of the present invention, the finisher 150 may be a finishing equipment as manufactured by Veit®, Macpi®, etc. In addition to the above, the manufacturing unit 115 may also include a pressing apparatus (not shown), a logo printing apparatus (not shown) and a delivery system (not shown). The pressing apparatus may be utilized for finishing and ironing the manufactured garment. The logo printing apparatus is utilized for logo marking on the manufactured garment. The delivery system may be any computing device such as a desktop, a PDA, a notebook computer, a tablet, a mobile device, or any wearable devices, and the like. The delivery system may be utilized for tracking and delivery of a garment being manufactured.

Figure 2:
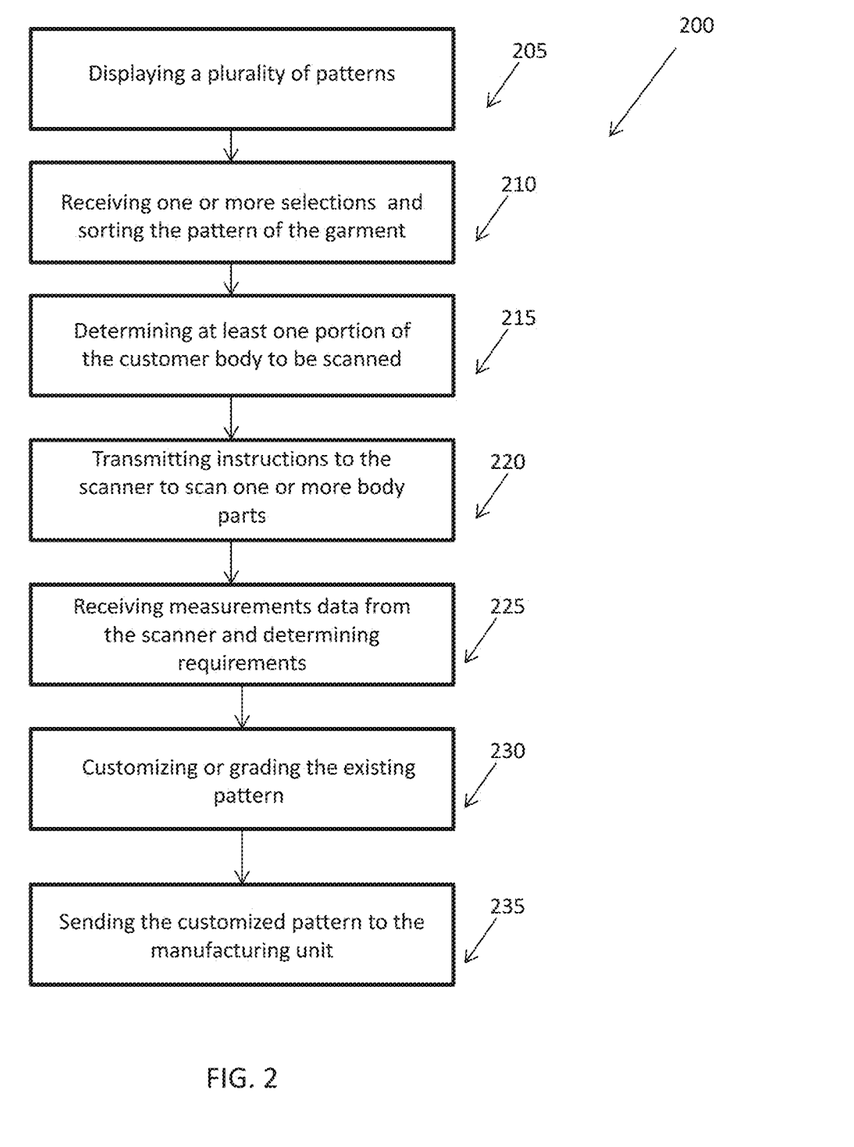
FIG. 2 is a flowchart for manufacturing the customized fit garment in accordance with some embodiments of the present technology.

FIG. 2 is a flowchart 200 for manufacturing customized garments for a customer based on preferences and sizing requirements of the customer in accordance with an embodiment of the present technology.

At 205, a plurality of options such as various types of garments, various styles for each type of garments, various types of fabrics available, various colors and designs of available fabrics and embellishments are displayed to the customer at a user interface 125 of a computing device 105. In addition to the plurality of options mentioned above, other options such as color tone, user preferences, event type, etc. are also displayed at the user interface 125. The plurality of options such as various types of garments, various styles for each type of garments, various types of fabrics available, various colors and designs of available fabrics, embellishments etc. are stored in a database placed locally or remotely. The designer or the authorized user may add, delete or modify the details regarding the various types of garments, various styles for each type of garments, various types of fabrics available, various colors and designs of available fabrics, embellishments etc. stored in the database. In accordance with an embodiment of the present technology, the various options such as type of garment, style of garment, color and fabric type are displayed to the customer in the form of selectable windows for receiving customer preferences for garment manufacturing.

At 210, the computing device 105 receives the customer selection from the options displayed on the user interface 125 and creates one or more designs for the garment based on the on the customer's selection of one or more of the type of garment, style of garment, fabric type, fabric design, and fabric color. In accordance with an embodiment of the present technology, the patterns for various types of garments are prepared, using a pattern making software or by some other means known in the art, by a designer or any authorized user. In an alternative embodiment, the customer can customize the created design or creates a new design for the garment.

At 215, at least one portion of the body of customer to be scanned for measurement is determined based on the created pattern of the garment. The at least one portion of the customer's body corresponds to required measurements for the garment to be manufactured as selected by the customer at the user interface 125. For instance, if the customer has selected a dress without sleeves, the computing unit 215 based on the selected pattern can determine that there is no need to take measurements for the sleeves, and thereby reducing the time for a scanner to scan the entire body of the customer. In accordance with one embodiment, the at least one body portion of the customer to be scanned depend on fabric type, fabric color, and fabric design selected by the customer.

At 220, instructions to the scanner 110 for scanning the determined at least one portion of the customer's body are transmitted. The instructions include list of one or more body parts of the customer to be scanned. In some embodiments, most or substantially all of the user's body can be scanned. A full body scan can be used to create patterns for any type of garment. A partial or full body scanning process can include performing one or more scans when the customer's body at one or more desired positions.

At 225, the measurements data is received at the computing device 105 from the scanner 110, and sizing requirements are determined for the customer. At 230, the created pattern is customized based on the determined measurements data from the scanner 110. In an exemplary embodiment, customizing the pattern may include grading the pattern or scaling up/down the pattern based on the determined measurements from the scanned data. In other embodiment, the pattern is also customized based on the fabric type and fabric design selected by the customer.

At 235, the customized pattern details are transmitted to the manufacturing unit 115 that manufactures the garment based on the customized pattern. In particular, the automated cutter cuts the selected fabric into pieces based on the customized pattern of the garment and the sewing machine stitches the pieces of the fabric together with a thread or any other means known in the art based on the customized pattern of the garment. The stitched garment is then provided a proper finish by the finisher and then finished garment is then provided to the delivery unit.

The customer can wear the fitted garment for one or more optional additional scans. The scans can be used to evaluate the fit of the finished garment. In addition to body scans, the scanner can capture one or more images (e.g., photographs) that are stored or provided to the customer for future reference.

In one embodiment, a brick-and-mortar store can produce the customizable garment within a relatively short period time, such as about 30 minutes, 45 minutes, one hour, or two hours. In retail settings, stores can be located in, for example, shopping centers, malls, etc. The user interface 125 (FIG. 1) can be located within the store so that a salesperson can help the customer select, for example, garment styles, existing template garments, fabrics, or the like. The customer's body can be scanned to obtain measurement data for producing the garment. In some embodiments, the scanner 110 (FIG. 1) can scan the customer's body in about 5 seconds, 10 seconds, 15 seconds, or 20 seconds. When the system 100 has stored measurement data for the customer, the customer may forgo body scanning. The system 100 can then produce the garment within a relatively short period time, such as about 20 minutes, 30 minutes, 40 minutes, 50 minutes, 1 hour, 2 hours, or other suitable length of time. During this time, the customer can continue to shop in the store or leave the store to perform other tasks.

Once the system 100 has the customer's measurement data, the customer can order customized garments by placing orders online (e.g., without visiting the store). The garment can be shipped directly to the customer or picked up by the customer at a convenient time. The system 100 can automatically determine a suitable scanning schedule and notify the customer about recommended scans. In some embodiments, an alert can be sent to notify the customer that a scanning session is recommended for ensuring that future garments fit correctly. Additionally, customer reports can be periodically sent or accessed so that the customer can track his or her overall health, changes in anatomy, or the like. For example, the report can include changes in body size, such as changes in waist size. Additionally or alternatively, the system 100 can recommend garments, designs, patterns, and send targeted advertisements based on the customers shopping patterns, measurement data, and preferences.

FIGS. 3A-3E illustrate exemplary user interfaces for customer interaction and receiving inputs corresponding to the garment to be manufactured in accordance with some embodiments of the present invention. The user interface 300 displays various designs and other data stored in the database 120 to the customer for selection. The user interface 300 receives one or more inputs from the customer corresponding to the displayed patters and other data. In an embodiment of the present technology, the user interface 300 is a touch screen panel or any interface through which the customer selects one or more items required for the manufacturing of customized garments. The touch screen panel can be located at a retail store. In some embodiments, the user interface 300 can be displayed on the customer's mobile device, computing device, tablet, or the like. In some online embodiments, the user interface 300 can be a website, online portal, or other displayable interface.

Figure 3A:
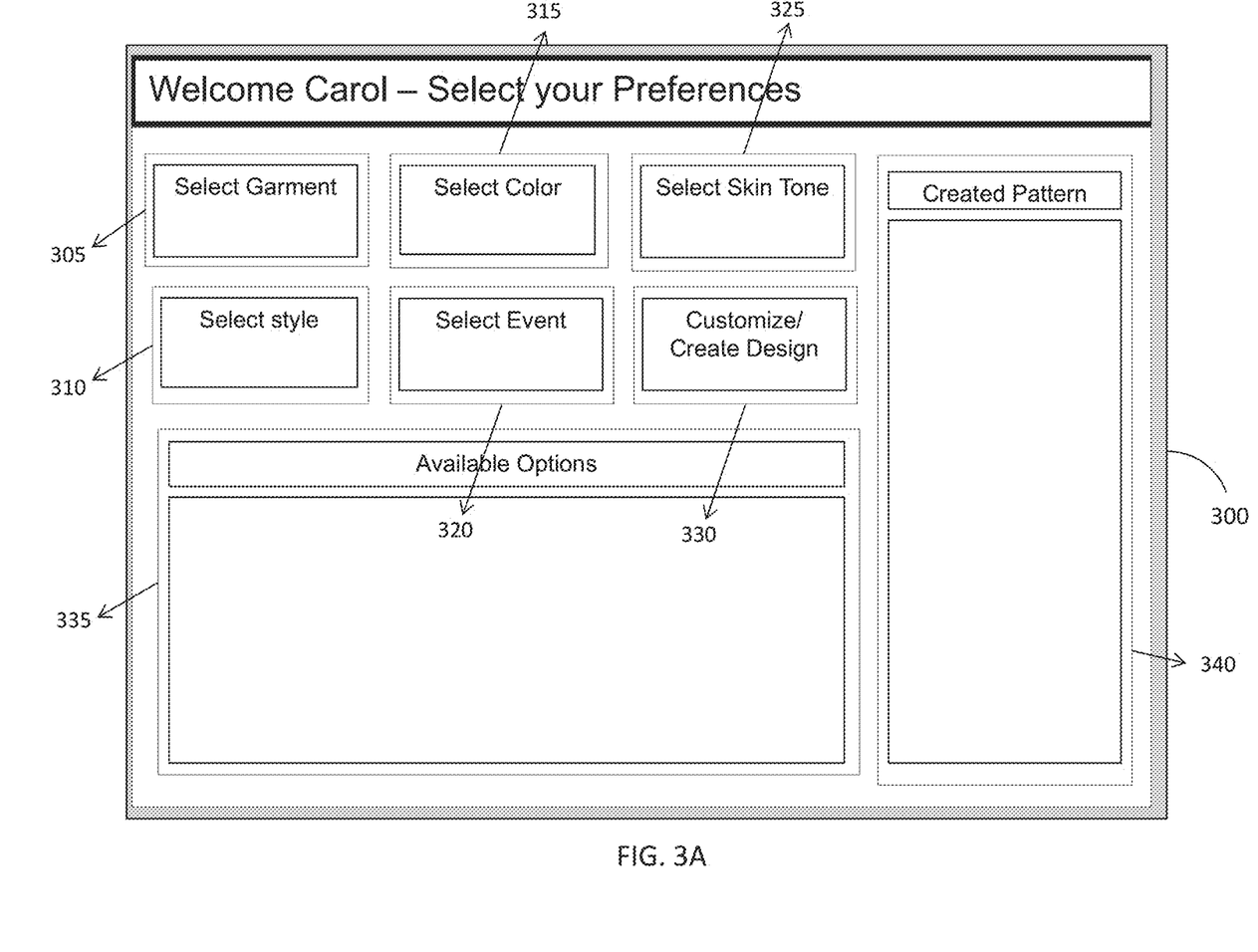
FIGS. 3A-3E illustrate exemplary user interfaces for customer interaction and receiving inputs corresponding to the garment to be manufactured in accordance with some embodiments of the present technology.

In accordance with an embodiment of the present technology, the user interface 300 displays various options for receiving customer preferences for garment manufacturing. The various options may be displayed in the form of selectable windows at the user interface. In the selectable windows, the various options displayed at the user interface 300 may include, but not limited to, type of garments 305, style of garment 310, color 315, and fabric type 320.

Figure 3B:
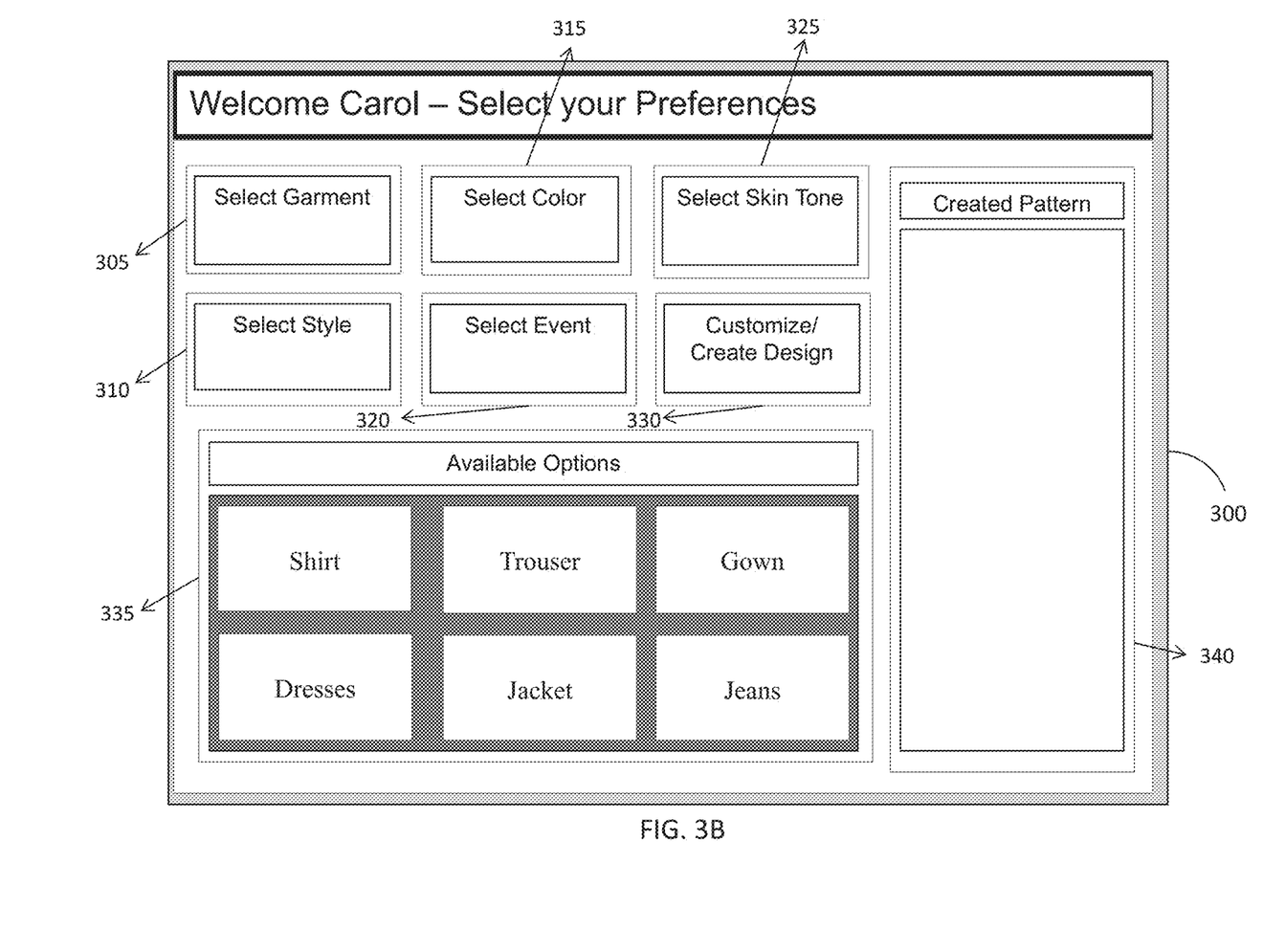

Each customer may be prompted to select one or more options displayed at the user interface 300. Upon receiving selection of a window at the user interface 300 from the customer, one or more corresponding options are displayed at the window 325. FIG. 3B illustrates an exemplary display of type of garments when the customer selects the window 305. The various options provided at the window 325 include, but not limited to, shirt, trouser, gown, dresses, jacket and jeans. The user may then select one of the various garment options, which he wishes to get manufactured. Similarly, when the customer selects the window 310, the options corresponding to the different style available for the garments are displayed. In accordance with an exemplary embodiment, the options for the styles available for a garment such as dress may include long length, knee length, half sleeves, full sleeves etc. Similarly, the options for fabric color, event, and skin tone may be provided to the customer when the customer selects the window 315, 320, and 325 respectively. The options for fabric color may include, but not limited to, red, white, black, and green. Similarly, the options for event may include, but not limited to, office wear, casual, and party wear etc. and the options for skin tone may include dark, tan, and pale etc.

Figure 3C:
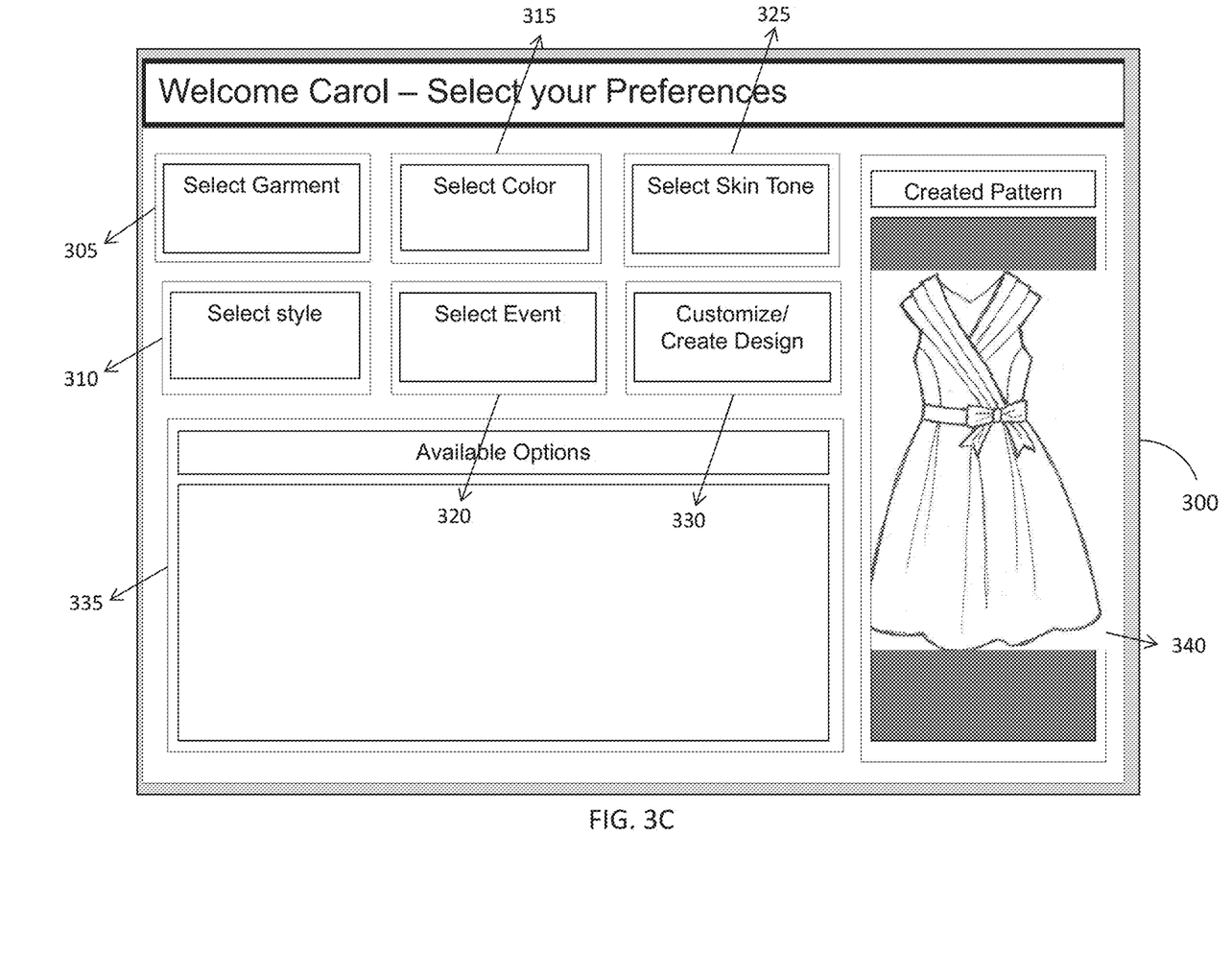
Figure 3D:
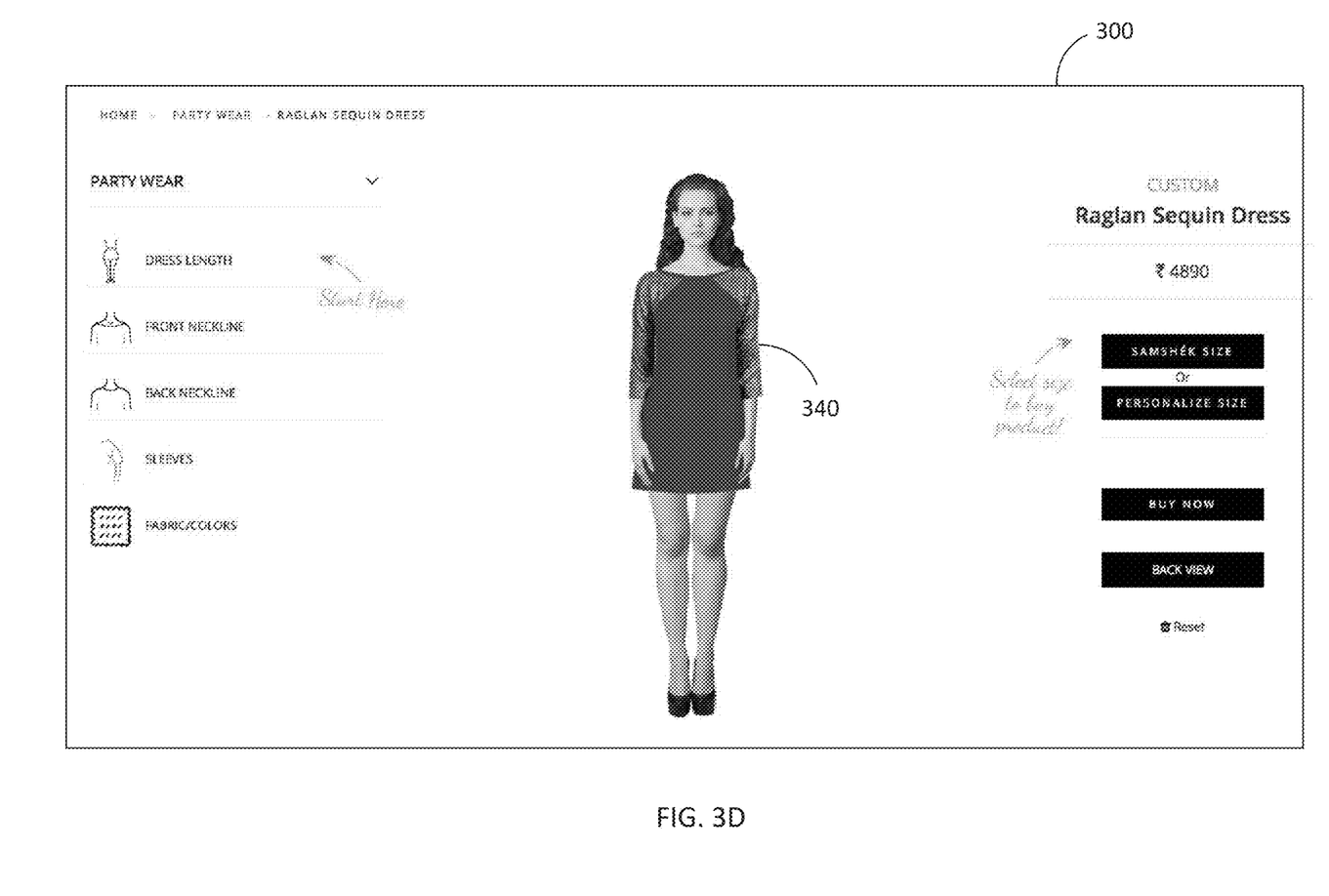
Figure 3E:
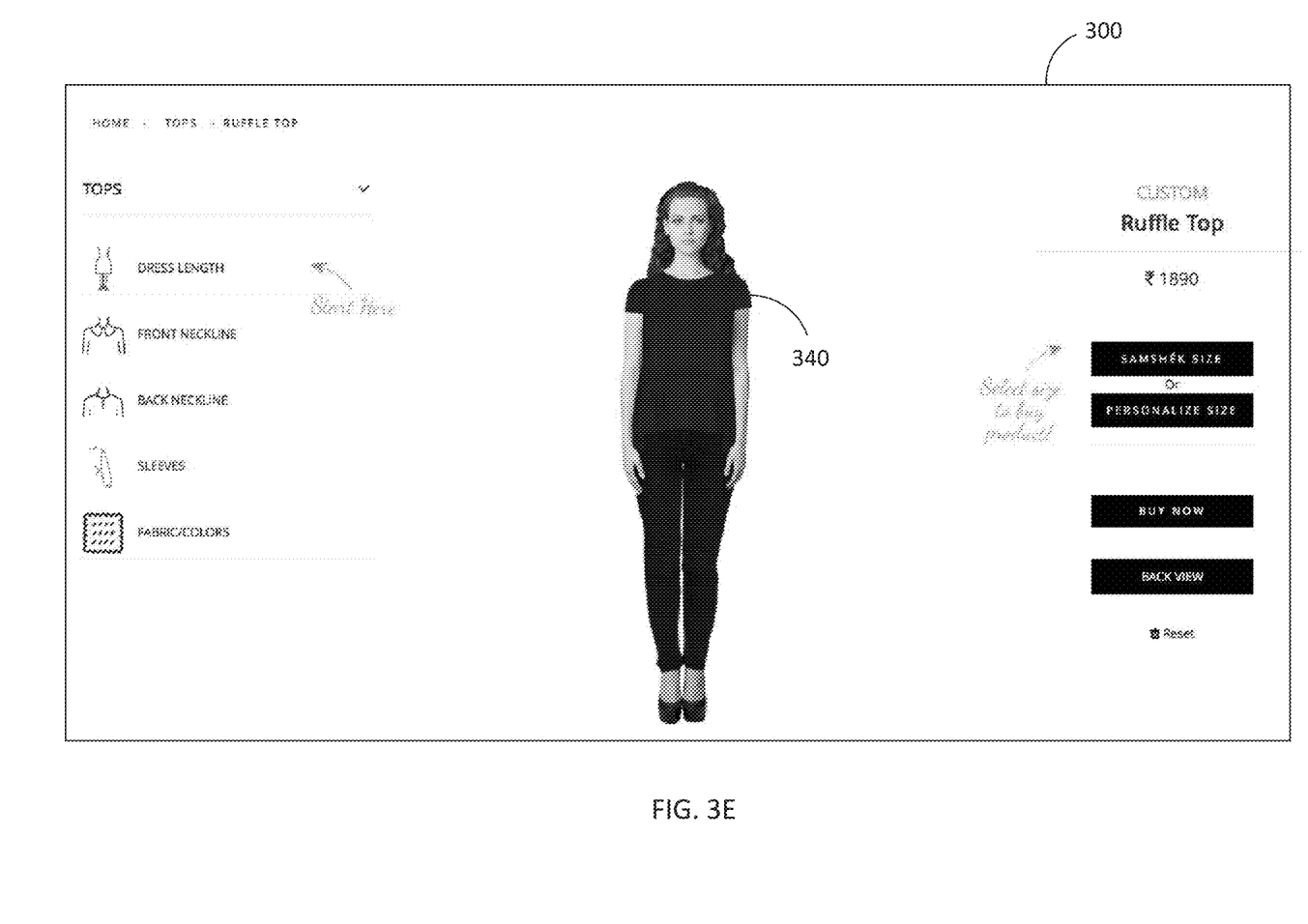

Once the customer has selected one or more of the type, style, color, and event etc for the garment, a pattern based on the customer selection is created by selection customize/create design option 330 on the user interface 300. FIG. 3C illustrates an exemplary display of a pattern of a dress 340 created based on the customer selection from the options displayed at the user interface 300. The user interface 300 also provides the customer with an option to customize the design of the dress or create a new pattern when the customer selected customize/create pattern option 330. FIGS. 3D-3E illustrates clothing 340 and selection items/windows.

For women's wear (e.g., dresses, tops shirts, etc.), the customization options can be dress length, sleeves, front neckline, back neckline, silhouette, fabric, color, etc. For men's shirts, the selection items can include fitting, length, collar, cuffs, buttons, pockets, fabric, color, etc. For women/men trousers, selection items can include length, fit, fabric, color, etc. A wide range of selection menus can be used to provide selection of the selection items.

At least some embodiments of the present invention can significantly reduce the time cycle of manufacturing of a custom fit garment and increases the automation in the garment manufacturing process. The garments manufactured using the claimed manufacturing process and system are manufactured with high accuracy and consistency of fit of the garment. This manufacturing process takes less than 2 hours to produce the garment with minimal inaccuracies in fittings and cutting.

Figure 4:
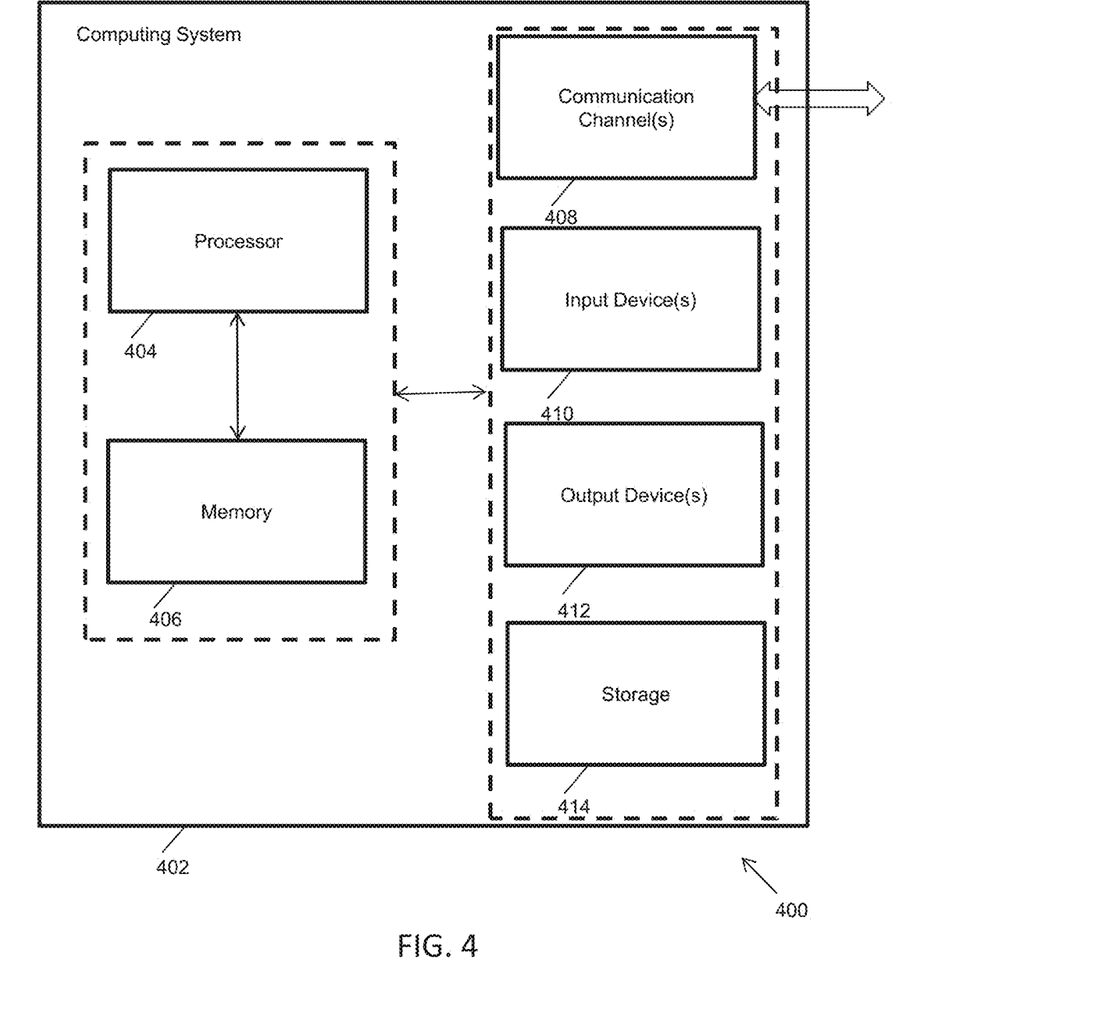
FIG. 4 illustrates an exemplary computer system in which various embodiments of the present technology may be implemented.

FIG. 4 illustrates an exemplary computer system in which various embodiments of the present invention may be implemented.

The computer system 402 comprises a processor 404 and a memory 406. The processor 404 executes program instructions and may be a real processor. The processor 404 may also be a virtual processor. The computer system 502 is not intended to suggest any limitation as to scope of use or functionality of described embodiments. For example, the computer system 402 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 406 may store software for implementing various embodiments of the present invention. The computer system 402 may have additional components. For example, the computer system 402 includes one or more communication channels 408, one or more input devices 410, one or more output devices 412, and storage 414. An interconnection mechanism (not shown) such as a bus, controller, or network, interconnects the components of the computer system 402. In various embodiments of the present invention, operating system software (not shown) provides an operating environment for various softwares executing in the computer system 402, and manages different functionalities of the components of the computer system 402.

The communication channel(s) 408 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 410 may include, but not limited to, a keyboard, mouse, pen, joystick, trackball, a voice device, a scanning device, or any another device that is capable of providing input to the computer system 402. In an embodiment of the present invention, the input device(s) 410 may be a sound card or similar device that accepts audio input in analog or digital form. The output device(s) 412 may include, but not limited to, a customer interface on CRT or LCD, printer, speaker, CD/DVD writer, or any other device that provides output from the computer system 502.

The storage 414 may include, but not limited to, magnetic disks, magnetic tapes, CD-ROMs, CD-RWs, DVDs, flash drives or any other medium which can be used to store information and can be accessed by the computer system 402. In various embodiments of the present invention, the storage 414 contains program instructions for implementing the described embodiments.

In an embodiment of the technology, the computer system 402 is part of a distributed network where various embodiments of the present invention are implemented for rapidly developing end-to-end software applications.

The present invention may be implemented in numerous ways including as a system, a method, or a computer program product such as a computer readable storage medium or a computer network wherein programming instructions are communicated from a remote location. For example, the system 100 in FIG. 1 can have a user interface 225 that is part of a website, an application (e.g., an application for a mobile device, such as a smartphone), or the like. In website based embodiments, a website can display a plurality of designs selectable by the customer. The system 100 can retrieve stored measurement data for the customer from the database 120 and based upon the stored measurement data, create a customized pattern. The customized pattern can be used to create the customized garment that is shipped to the customer or picked up by the customer at a brick-and-mortar store. The customer's body can be periodically scanned to update the measurement data associated with the customer.

Some embodiments of the technology can be directed to system including a means for creating a pattern for a garment to be manufactured. The system can further include means for scanning at least a portion of the customer's body. In one embodiment, the means for creating the pattern can determine sizing for the garment to be manufactured based on the customer's body scan. In one embodiment, the means for creating the pattern can customize a pattern for the garment to be manufactured based on the determined size for the garment to be manufactured. An automated means for manufacturing the garment can manufacture the garment based on the customized pattern. The automated means for manufacturing the garment can include, without limitation, a single ply cutter, sewing machine, vacuum, blowing device, and steaming table.

At least some of the embodiments disclosed herein are methods manufacturing a customized garment for customers. The method includes creating, by a computing device, a design for the garment to be manufactured. One or more scanners can be used to scan at least the portion of the body of the customer based on the determined portion of the body of the customer to determine sizing requirements for the garment to be manufactured. The pattern can be customized for the garment to be manufactured based on the determined sizing requirement. The garment can be manufactured manually and/or automatically. In retail settings, a pattern can be automatically customized, and the garment can be manually sewn on site. Accordingly, all or most of the method can be performed on-site. In some embodiments, an on-site or off-site automated sewing machine can be used to stitch the fabric.

The present technology may suitably be embodied as a computer program product for use with the computer system 402. The method described herein is typically implemented as a computer program product, comprising a set of program instructions which is executed by the computer system 402 or any other similar device. The set of program instructions may be a series of computer readable codes stored on a tangible medium, such as a computer readable storage medium (storage 414), for example, diskette, CD-ROM, ROM, flash drives or hard disk, or transmittable to the computer system 402, via a modem or other interface device, over either a tangible medium, including but not limited to optical or analogue communications channel(s) 408. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure and can be combined or used with embodiments or features disclosed in International Application No. PCT/IB2017/000053 (WO 2017/122088) entitled SYSTEM AND METHOD FOR MANUFACTURING OF GARMENTS, filed Jan. 12, 2017, which claims the benefit of U.S. Provisional Patent Application No. 62/277,861 entitled SYSTEM AND METHOD FOR MANUFACTURING OF GARMENTS, filed Jan. 12, 2016, both of which are incorporated herein by reference in their entireties. This disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for manufacturing a customized garment for a customer, the method comprising:

creating, by a computing device, a pattern for a garment to be manufactured, wherein the pattern is created based on inputs, received from the customer, corresponding to each of a type, a style, a color, and a fabric of the garment to be manufactured;

automatically determining, by the computing device, specific portions of the body of the customer to be scanned based on the created pattern for the garment to be manufactured;

scanning, by a scanner, only the specific portions of the body of the customer based on the determined specific portions of the body of the customer to determine at least one sizing requirement for the garment to be manufactured;

customizing/grading the created pattern for the garment to be manufactured based on the determined at least one sizing requirement; and automatically manufacturing at least a portion of the garment based on the customized/graded pattern.

2. The method of claim 1, further comprising: customizing the pattern based on customer preferences.

3. The method of claim 1, wherein creating the pattern for the garment comprises:

displaying a plurality of options related to the garment to be manufactured to the customer;

receiving selection corresponding to the displayed one or more options; and creating the pattern for the customer based on the received selection from the customer.

4. The method of claim 3, wherein the plurality of options related to the garment comprises each of types of the garment, styles of the garment, colors of the garment, and fabrics of the garment.

5. The method of claim 4, further comprising:

storing data related to the types of the garment, the styles of the garment, the colors of the garment, and the fabrics of the garment in a database.

6. The method of claim 1, wherein automatically manufacturing the garment based on the customized/graded pattern comprises:

cutting the selected fabric into pieces based on the customized/graded pattern by an automated single ply cutter;

stitching the fabric pieces into the customized garment by an automated sewing machine; and finishing the customized garment by one or more of vacuum, blowing, and steaming table.

7. The method of claim 1, wherein both (1) scanning at least the portion of the body of the customer and (2) automatically manufacturing at least the portion of the garment are performed at a single location.

8. The method of claim 1, wherein scanning the customer's body is performed at a brick and mortar store and automatic manufacturing of the garment is performed offsite of the brick and mortar store.

9. The method of claim 1, wherein scanning the customer's body is performed at a first location and automatic manufacturing of the garment is performed at a second location.

10. A method for on-site manufacturing a customized garment for a customer, the method comprising:

creating, by a computing device, a pattern for the customized garment to be manufactured, wherein the pattern is created based on inputs, received from the customer, corresponding to each of a type, a style, a color, and a fabric of the garment to be manufactured;

determining, by the computing device, specific portions of the body of the customer to be scanned based on the created pattern for the garment to be manufactured;

scanning, by a scanner, only the specific portions of the body for obtaining information for producing a customized pattern; and on-site manufacturing of the customized garment based on the customized pattern.

11. The method of claim 10, wherein on-site manufacturing of the garment based on the customized pattern comprises:

automatically cutting fabric into pieces based on the customized pattern by an automated single ply cutter; and stitching the fabric pieces into the customized garment by an automated sewing machine.

12. A system for manufacturing a customized garment for a customer, the system comprising:

a processor configured to create a pattern for the garment to be manufactured and automatically determine specific portions of the body of the customer to be scanned based on the created pattern, wherein the pattern is created based on inputs, received from the customer, corresponding to each of a type, a style, a color, and a fabric of the garment to be manufactured;

a scanner configured to scan only the specific portions of the body of the customer based on the determined specific portions of the body of the customer;

the processor configured to determine sizing requirements for the garment to be manufactured based on the scanned specific portions of the body of the customer;

the processor configured to customize the pattern for the garment to be manufactured based on the determined size for the garment to be manufactured; and an automatic manufacturing unit configured to manufacture the garment based on the customized pattern.

13. The system of claim 12, further comprising:

a user interface for displaying one or more options related to garment to be manufactured to the customer and receiving selection corresponding to the displayed one or more options; and the processor for creating the pattern for the customer based on the received selection from the customer.

14. A system for manufacturing a customized garment for a customer, the system comprising:

memory storing executable instruction; and at least one processor that are configured to execute the instructions to:

create, by a computing device, a pattern for the garment to be manufactured, wherein the pattern is created based on inputs, received from the customer, corresponding to each of a type, a style, a color, and a fabric of the garment to be manufactured;

automatically determine, by the computing device, specific portions of the body of the customer to be scanned based on the created pattern for the garment to be manufactured;

scan, by a scanner, only the specific portions of the body of the customer based on the determined specific portions of the body of the customer to determine sizing requirements for the garment to be manufactured;

customize/grade the pattern for the garment to be manufactured based on the determined sizing requirement; and automatically manufacture at least a portion of the garment based on the customized pattern.

15. The system of claim 14, wherein the instructions are executable to customize/grade the pattern for the garment to be manufactured based on style of the style, wherein the style includes at least one of a tight fit, a loose fit, a sleeve length, or knee length.

16. A method for manufacturing a customized garment, the method comprising:

receiving a type, a style, a color, and a fabric of the customized garment, wherein the type, the style, the color, and the fabric are individually inputted by a customer;

creating, by a computing device, a pattern for the customized garment to be manufactured based on the received type, style, color, and fabric individually inputted by the customer;

automatically determining, by the computing device, specific portions of the body of the customer to be scanned based on the created pattern;

performing a partial body scan of the customer by scanning each of the determined specific portions of the customer using at least one scanner;

determine at least one sizing requirement for the garment to be manufactured based on the partial body scan;

customizing/grading the created pattern for the garment to be manufactured based on the determined at least one sizing requirement; and automatically manufacturing at least a portion of the garment based on the customized/graded pattern.

17. The method of claim 16, further comprising customizing/grading the created pattern for the garment based on one or more user preferences and/or the received type and/or style.

18. The method of claim 16, wherein determine the at least one sizing requirement is based on at least one of the type, the style, the color, or the fabric.

* * * * *